US011085700B2

(12) United States Patent
Ranjan (10) Patent No.: US 11,085,700 B2
(45) Date of Patent: Aug. 10, 2021

(54) BRANCHING HEAT EXCHANGERS

(71) Applicant: Hamilton Sundstrand Corporation, Charlotte, NC (US)

(72) Inventor: Ram Ranjan, West Hartford, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 158 days.

(21) Appl. No.: 16/180,686

(22) Filed: Nov. 5, 2018

(65) Prior Publication Data
US 2020/0141654 A1    May 7, 2020

(51) Int. Cl.
| F28D 7/00 | (2006.01) |
| B23P 15/26 | (2006.01) |
| F28F 9/02 | (2006.01) |
| G06F 17/18 | (2006.01) |

(52) U.S. Cl.
CPC .............. F28D 7/005 (2013.01); B23P 15/26 (2013.01); F28F 9/0219 (2013.01); G06F 17/18 (2013.01)

(58) Field of Classification Search
CPC ........ F28D 7/005; F28D 7/0058; B23P 15/26; F28F 9/0219; F28F 2210/02; F28F 2255/18; G06F 17/18
See application file for complete search history.

(56) References Cited

U.S. PATENT DOCUMENTS

| 8,359,744 | B2 | 1/2013 | Hislop et al. |
| 9,134,072 | B2 | 9/2015 | Roisin et al. |
| D818,093 | S | 5/2018 | Erno et al. |
| 9,976,815 | B1 | 5/2018 | Roper et al. |

(Continued)

FOREIGN PATENT DOCUMENTS

| EP | 3124906 A1 | 2/2017 |
| WO | WO2011115883 A2 | 9/2011 |

(Continued)

OTHER PUBLICATIONS

P. Papazoglou, Topology Optimization of Heat Exchangers, Master's thesis, Delft University of Technology, pp. 1-76 URL: http://resolver:tudelft:nl/uuid: 08481ec6-d6df-4162-b254-8b99eeccc6d1 (Year: 2015).*

(Continued)

*Primary Examiner* — Rehana Perveen
*Assistant Examiner* — Steven W Crabb
(74) *Attorney, Agent, or Firm* — Kinney & Lange, P. A.

(57) ABSTRACT

A heat exchanger includes an external casing and a core. The external casing includes a first inlet, a first outlet, a second inlet, and a second outlet. The core includes an array of branched channels connecting the first inlet and first outlet, an inlet header, and an outlet header. The inlet header is integrally formed with and fluidly connected to the first inlet. The outlet header is integrally formed with and fluidly connected to the first outlet. The branched channels and the external casing define a fluidic passage. The array of branched channels includes a first split, a first juncture, a secondary split, a secondary juncture, and a subset of splits and junctures. The first split and first juncture are common to an entirety of the array of branched channels. The subset of splits and junctures route fluid through interconnections between fluidly parallel branched channels.

20 Claims, 6 Drawing Sheets

(56) References Cited

U.S. PATENT DOCUMENTS

| | | |
|---|---|---|
| 2003/0000687 A1 | 1/2003 | Mathur et al. |
| 2017/0131034 A1 | 5/2017 | Ribarov et al. |
| 2017/0248372 A1 | 8/2017 | Erno et al. |
| 2018/0297843 A1 | 10/2018 | Lo et al. |
| 2019/0315067 A1* | 10/2019 | Babu .................... B29C 64/386 |

FOREIGN PATENT DOCUMENTS

| | | |
|---|---|---|
| WO | WO2017052798 A1 | 3/2017 |
| WO | WO2017/129768 A1 | 8/2017 |

OTHER PUBLICATIONS

Martin Philip Bendsoe, et al., "Generating Optimal Topologies in Structural Design Using a Homogenization Method," Computer Methods in Applied Mechanics and Engineering 71 pp. 197-224 (1988) (Year: 1988).*
Extended European Search Report for EP Application No. 19193797.8, dated Mar. 24, 2020, 8 pages.

* cited by examiner

BRANCHING HEAT EXCHANGERS

STATEMENT OF GOVERNMENT INTEREST

This invention was made with government support under Contract #DE-AR0000855 awarded by the Department of Energy. The government has certain rights in the invention.

BACKGROUND

The present disclosure generally relates to heat exchangers. In particular, the present disclosure relates to the design and manufacture of heat exchangers.

In various engineering applications, heat exchangers are utilized to exchange thermal energy from one fluid stream to another fluid stream. In the case of aircraft environmental control systems, thermal energy transfer often occurs between low pressure RAM air and high pressure bleed air. Heat exchanger cores are typically designed by using reduced-order models designed in a computer aided design process. These conventional heat exchanger designs are typically suitable for conventional, non-layer-by-layer additive manufacturing processes. These existing heat exchangers often have high pressure drops in the headers and poor flow distribution into the heat exchanger cores which lead to a reduction in the overall efficiency of the thermal energy transfer process.

SUMMARY

A heat exchanger includes an external casing and a core disposed within the external casing. The external casing includes a first inlet, a first outlet in fluid communication with the first inlet, a second inlet, and a second outlet in fluid communication with the second inlet. The core includes an array of branched channels connecting the first inlet and first outlet, an inlet header, and an outlet header. The inlet header is integrally formed with and fluidly connected to the first inlet and to the array of branched channels. The outlet header is integrally formed with and fluidly connected to the first outlet and to the array of branched channels. An exterior of the branched channels and the external casing define a fluidic passage between the second inlet and the second outlet. The array of branched channels includes a first split at the inlet header, a first juncture at the outlet header, a secondary split, a secondary juncture, and a subset of splits and junctures. The first split and first juncture are common to an entirety of the array of branched channels. The secondary split and juncture are situated between the inlet header and the outlet header. The subset of splits and junctures route fluid through interconnections between fluidly parallel branched channels.

A method of making a heat exchanger with a heat exchanger core includes defining a space into which the heat exchanger will fit. Boundary conditions, design objectives, and constraints are entered into a topology optimization tool. The design objectives include at least one of minimizing pressure drop, minimizing mass, and maximizing thermal energy transfer. The topology optimization tool creates a three dimensional design of a heat exchanger core based on the entered objectives, constrains, and boundary conditions. The core includes an array of branched channels connecting the first inlet and first outlet, an inlet header, and an outlet header. The array of branched channels includes a first split at the inlet header, a first juncture at the outlet header, a plurality of secondary splits, and a plurality of secondary junctures. The first split and first juncture are common to an entirety of the array of branched channels. The secondary splits and junctures are situated between the inlet header and the outlet header. A subset of the secondary splits and junctures route fluid through interconnections between fluidly parallel branched channels. A tooling pathway of a layer-by-layer additive manufacturing device is determined based on the three dimensional design of the heat exchanger core. The heat exchanger core is built with the layer-by-layer additive manufacturing device based on the determined tooling pathway.

The present summary is provided only by way of example, and not limitation. Other aspects of the present disclosure will be appreciated in view of the entirety of the present disclosure, including the entire text, claims, and accompanying figures.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

Figure 1:
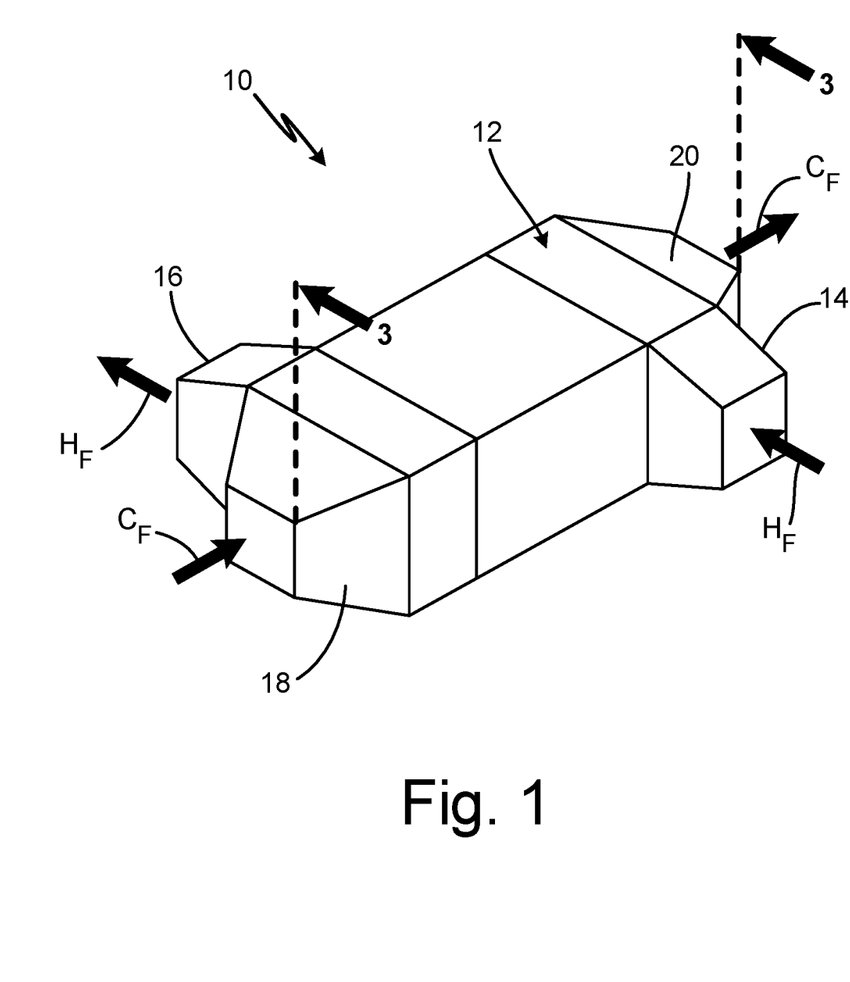
FIG. 1 is a perspective view of a heat exchanger with an external casing.

FIG. 1 is a perspective view of heat exchanger 10 and shows external casing 12, hot inlet 14, hot outlet 16, cold inlet 18, cold outlet 20, hot flow $H_F$, and cold flow $C_F$.

Heat exchanger 10 is a device for transferring thermal energy from a first fluid to a second fluid. External casing 12 is a housing with a cavity contained therein and includes hot inlet 14, hot outlet 16, cold inlet 18, and cold outlet 20. Hot inlet 14 and cold inlet 18 are fluidic inlets of external casing 12. Hot outlet 16 and cold outlet 20 are fluidic outlets of external casing 12. Hot flow $H_F$ is a flow of a hot fluid, such as air. Cold flow $C_F$ is a flow of a cold fluid, such as air, that has a less amount of thermal energy than compared to hot flow $H_F$.

In one non-limiting embodiment, heat exchanger 10 with external casing 12 is mounted in an aircraft environmental control system ("ECS", not shown) and is connected to a source of low pressure RAM air and a source of high pressure bleed air. In this example, hot inlet 14 is connected to the source of high pressure bleed air and hot outlet 16 is connected to an air cycle machine of the aircraft. Also in this example, cold inlet 18 is connected to the source of low pressure RAM air and cold outlet 20 is connected to another component of the aircraft (e.g., the ECS). Hot flow $H_F$ passes into heat exchanger 10 via hot inlet 14 and out of heat exchanger 10 via hot outlet 16. Cold flow $C_F$ passes into heat exchanger 10 via cold inlet 18 and out of heat exchanger 10 via cold outlet 20.

Heat exchanger 10 is configured to transfer thermal energy from hot flow $H_F$ to cold flow $C_F$ within external casing 12. Hot inlet 14 receives hot flow $H_F$ from the source of high pressure bleed air and transfers hot flow $H_F$ to a core (see e.g., FIG. 2) within external casing 12. Hot outlet 16 transfers hot flow $H_F$ out of the core within external casing 12 to, for example, the air cycle machine of the aircraft. Cold inlet 18 receives cold flow $C_F$ from the source of low pressure RAM air and transfers cold flow $C_F$ to the cavity within external casing 12. Cold outlet 20 transfers cold flow $C_F$ out of exterior casing 12 to another component of the aircraft. Hot flow $H_F$ passes in through hot inlet 14, through the core of heat exchanger 10, and out through hot outlet 16. Cold flow $C_F$ passes in through cold inlet 18, through a fluid passage formed by an exterior of the core and an inner surface of external casing 12, and out through cold outlet 20.

As will be discussed with respect to FIGS. 2 through 5, heat exchanger 10 includes a design created by topological optimization, in conjunction with layer-by-layer additive manufacturing, in order to produce a heat exchanger core that leads to a reduction in heat exchanger volume and a reduction in pressure drop as compared to conventional heat exchanger designs/constructions such as configurations with plate-fin strip fins. Heat exchanger 10 with exterior case 12 also includes a hybrid cross-counter flow behavior that optimizes thermal energy transfer between hot flow $H_F$ and cold flow $C_F$.

Figure 2:
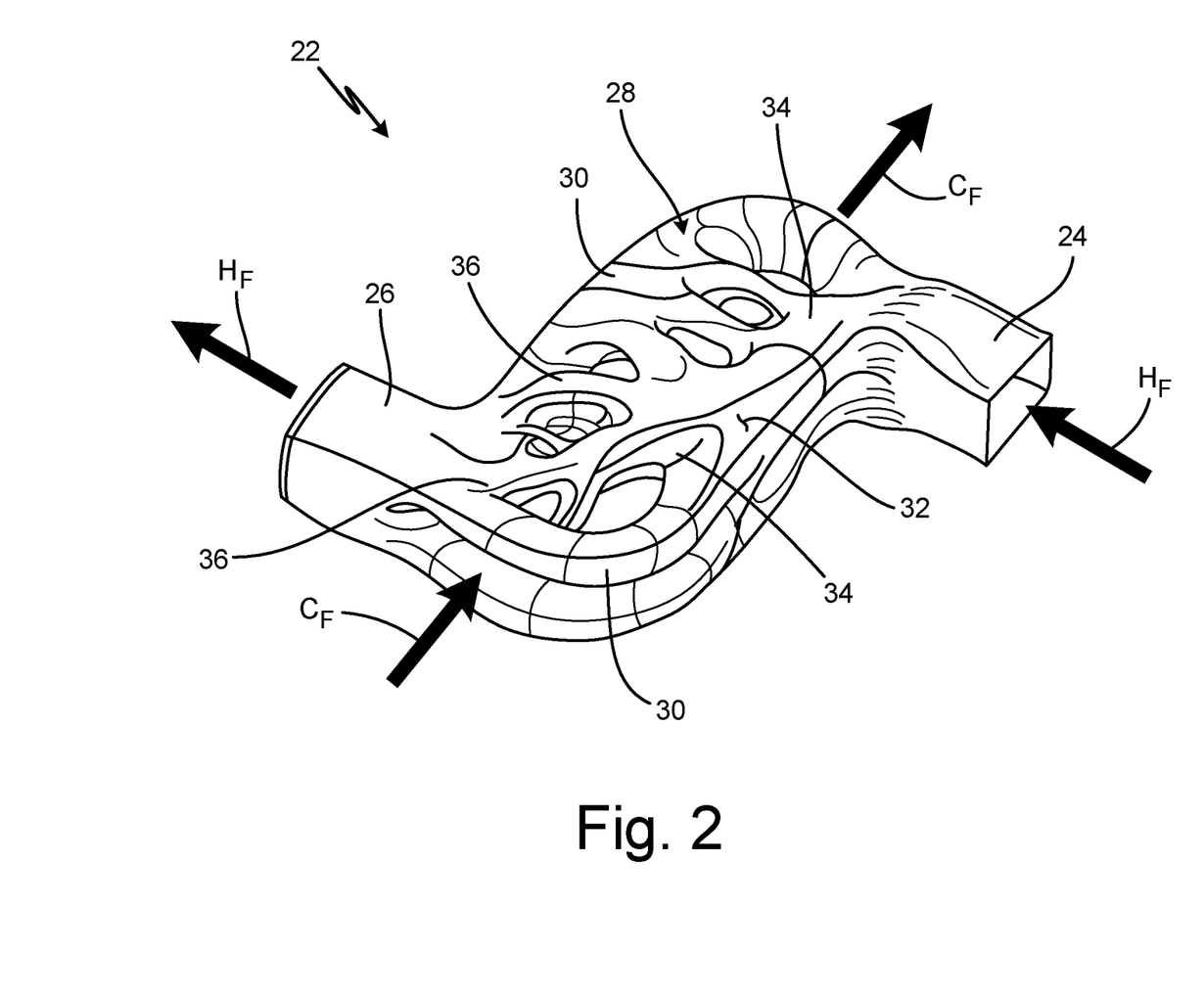
FIG. 2 is a perspective view of a first heat exchanger core.

FIG. 2 is a perspective view of core 22, ordinarily situated within external casing 12. FIG. 2 illustrates inlet header 24, outlet header 26, array 28 of branched channels 30, exterior surface 32, splits 34, junctures 36, hot flow $H_F$, and cold flow $C_F$.

Core 22 is an internal fluidic circuit with a plurality of branched channels 30. In this example, core 22 with array 28 of branched channels 30 is designed in part with a topological optimization tool and is constructed with a layer-by-layer additive manufacturing process. In this example, core 22 is formed with layer-by-layer additive manufacturing and includes a metal or polymer material. In this example, the layer-by-layer additive manufacturing process used to create core 22 can include at least one of laser powder bed fusion, an electron-beam melting, a directed energy deposition, a cold spray, a hot isostatic pressing, as well as a hybrid layer-by-layer additive manufacturing process (e.g., combination of additive and subtractive manufacturing processes).

Embodiments of heat exchanger 10 with core 22 described herein leverage topology optimization and layer-by-layer additive manufacturing that allow for the construction of heat exchanger 10 to include continuous, homogeneous transitions between external casing 12, core 22, and other components of heat exchanger 10. Continuous, homogeneous transitions between elements within core 22 enable incorporation of critical performance considerations such as increased thermal energy transfer, reduced mass, decreased pressure drop, increased structural reliability, and minimized support structure requirements. Additional boundary requirements can include flow rates into and out of heat exchanger 10, temperatures of hot flow $H_F$ and cold flow $C_F$, and pressures of hot flow $H_F$ and cold flow $C_F$.

These considerations are entered into the topological optimization tool as boundary conditions so that the topological optimization tool can incorporate them in creating a three dimensional design of core 22 to be built by a layer-by-layer additive manufacturing process. The information or modeling output(s) of the topological optimization tool can then provide a modified shape of core 22 that incorporates one or all of the boundary conditions yet still allows heat exchanger 10 with core 22 to maintain desired and/or requisite operational capabilities (such as the performance characteristics discussed above).

Inlet header 24 is a fluidic opening and inlet of array 28. Outlet header 26 is a fluidic opening and outlet of array 28. Array 28 is a series or arrangement of interconnected branched channels 30. In this example, array 28 includes a pattern-less distribution of branched channels 30 such that there are no repeating patterns of branched channels 30, splits 34, and/or junctures 36 within core 22. The non-repeating pattern of branched channels 30 is in comparison to conventional heat exchanger designs incorporating patterned fins, channels, and layers.

Branched channels 30 are flow channels configured to transport fluid. In this example, a shape of each of branched channels 30 can vary throughout array 28 (see e.g., FIGS. 5A-5C). Exterior surface 32 is an outermost layer of array 28 of branched channels 30. Splits 34 are points where branched channels 30 diverge from a single branched channel 30 to one or more branched channels 30. Junctures 36 are points where one or more branched channels 30 converge to form a single branched channel 30.

In the illustrated embodiment, there are a number of splits 34 and a number of junctures 36 shown as included in array 28. In other non-limiting examples, more or less than the number of splits 34 and junctures 36 (shown in FIG. 2) can be included so as to increase or decrease, respectively an amount of hot fluid volume fraction in the space of external casing 12. For example, a higher number of splits 34 and junctures 36 results in an increased number of branched channels 30, thereby resulting in an increased volume for hot flow $H_F$ to occupy within core 22. In comparison, a lower number of splits 34 and junctures 36 results in a decreased number of branched channels 30, thereby resulting in a decreased volume for hot flow $H_F$ to occupy within core 22. In one non-limiting embodiment, a prescribed flow rate, a quantity of channels 30, a branching pattern of array 28, and convolutions formed for hot flow $H_F$ are determined by a topology optimizer algorithm based on a set pressure drop constraint. For example, a lower pressure drop constraint leads to fewer convolutions and less branching of array 28. For cold flow $C_F$, flow paths are less convoluted and more aerodynamic around branched channels 30 if a lower pressure drop for cold flow $C_F$ is set as a constraint. In another non-limiting example, more convolutions and longer flow paths are created if the permissible pressure drop is relatively high.

Core 22 is mounted in and connected to external casing 12 (shown in FIG. 1). In this example, core 22 is integrally formed with external casing 12 by way of forming both external casing 12 and core 22 with an layer-by-layer additive manufacturing process that forms inlet header 24 together with hot inlet 14 of external casing 12 and outlet header 26 together with hot outlet 16. In this example, core 22 includes a general exterior shape that matches the shape of exterior 12, such as a cuboid shape. In other examples, core 22 can include a non-cuboid shape such as a toroid/ torus, an ellipsoid, and/or a serpentine shape, as well as shapes with curved surfaces as opposed to flat/planar faces.

Inlet header 24 is connected to and integrally formed with a portion of branched channels 30. Inlet header 24 is fluidly connected to the source of high pressure bleed air and to array 28 of branched channels 30. Outlet header 26 is connected to and integrally formed with another portion of branched channels 30. Outlet header 26 is fluidly connected to, in this example, the air cycle machine of the aircraft. Array 28 extends between and connects inlet header 24 to outlet header 26.

Branched channels 30 are fluidly connected to inlet header 24 to outlet header 26. In this example, branched channels 30 are interconnected and fluidly parallel. Also in this example, a number or quantity, as well as a spacial distribution of branched channels 30 is determined based on a temperature gradient between hot flow $H_F$ and cold flow $C_F$. For example, a higher number of branched channels 30 and corresponding surface area of exterior surface 32 is present in a region (or regions) of array 28 where a large temperature differential exists between hot flow $H_F$ and cold flow $C_F$ (as shown in FIG. 2, a higher number of branched channels 30 are positioned near where cold flow $C_F$ enters into array 28 of branched channels 30).

Additionally, array 28 of branched channels 30 does not include any patterned features. For example, many existing heat exchangers incorporate a patterned heat exchanger core including a layered configuration with channels with uniform and determined shapes. Here, arrays 28 of branched channels 30 converge and diverge throughout core 22. Also in this example, branched channels 30 are shown as having varying shapes, sizes, diameters, and outer boundary lengths throughout array 28. Here, outer boundary lengths of branched channels 30 vary throughout array 28 by varying at least one of between different branched channels 30, along one of branched channels 30, and/or as a function of position along a flow path of one of branched channels 30. In this example, an outer boundary length of one of branched channels 30 is described as similar to a circumference of one of branched channels 30, in that the outer boundary length is the distance along exterior surface 32 of one of branched channels 30 as measured perpendicular to a direction of fluid flow through a particular point of branched channel 30.

In this example, the shapes (e.g., cross-section shapes) of branched channels 30 change throughout array 28 based on a local pressure differential at specific portions along branched channels 30. The shapes of branched channels 30 are determined by a local internal pressure of the fluid(s) passing therethrough such as hot flow $H_F$. In one example of a metallic core 22, circular (or elliptical) shaped branched channels 30 are used at locations where a high pressure differential (e.g., equal to or greater than 100 psi or 689 kilopascal) is present between hot flow $H_F$ and cold flow $C_F$. In an example of a polymer core 22, circular (or elliptical) shaped branched channels 30 are used at locations where a high pressure differential (e.g., equal to or greater than 15 psi or 103 kilopascal) is present between hot flow $H_F$ and cold flow $C_F$.

Exterior surface 32 is disposed on an outermost and outward facing layer of array 28 of branched channels 30. In this example, external casing 12 and exterior surface 32 of array 28 of branched channels 30 define a fluidic passage between cold inlet 18 and cold outlet 20 of external casing 12. Splits 34 and junctures 36 are formed with, connected to, and as a part of array 28 of branched channels 30.

Core 22 transports hot flow $H_F$ from hot inlet 14, through external casing 12, and to hot outlet 16. As hot flow $H_F$ flows through core 22, cold flow $C_F$ passes through external casing and across exterior surface 32. Inlet header 24 receives hot flow $H_F$ from hot inlet 14 of external casing 12 and transfers hot flow $H_F$ to branched channels 30. Outlet header 26 receives hot flow $H_F$ from branched channels 30 and transfers hot flow $H_F$ to hot outlet 16. Array 28 of branched channels 30 transports hot flow $H_F$ through external casing from inlet header 24 to outlet header 26.

Branched channels 30 are arranged within external casing 12 such that the directions of hot flow $H_F$ and cold flow $C_F$ through array 28 form a hybrid cross-counter flow behavior. For example, through some portions of array 28, hot flow $H_F$ flows in a direction that is generally perpendicular to a direction of flow of cold flow $C_F$ across array 28. In other portions of array 28, hot flow $H_F$ flows in a direction that is generally opposite to a direction of flow of cold flow $C_F$ across array 28. This combination of multiple directions of flow of hot flow $H_F$ (and/or cold flow $C_F$) creates the hybrid cross-counter flow behavior of heat exchanger 10.

With branched channels 30 being integrally formed with inlet header 24 and outlet header 26, joints traditionally created from joining an existing core with separate headers, and the related stress concentrations of those joints, are eliminated from heat exchanger 10. Exterior surface 32 of branched channels provides a surface area through which thermal energy is transferred conductively from hot flow $H_F$ in branched channels 30 to cold flow $C_F$ that is flowing in the space formed between exterior surface 32 and external casing 12. As cold flow $C_F$ comes into contact with exterior surface 32 of branched channels 30, thermal energy is transferred from hot flow $H_F$ to branched channels 30 and then from exterior surface 32 to cold flow $C_F$.

Splits 34 and junctures 36 act to split and merge multiple flows of hot flow $H_F$ throughout array 28. In existing heat exchangers, blockages in the form of strip/pin fins are introduced into the flow. As the flow comes into contact with one of the blockages, the boundary layer of the flow is broken in order to reduce the thermal developing length so that thermal energy transfer is high. Here, array 28 of core 22 splits and merges branched channels 30 in three dimensions to create the effect of smaller developing lengths as well as providing for inter-layer mixing. For example, before a thermal boundary layer grows completely within a branched channel 30, one of splits 34 or junctures 36 either diverts or combines the flow of hot flow $H_F$. After the flow of hot flow $H_F$ is diverted or merged, then another boundary layer beings to form. Then, just before this new boundary layer forms completely, another split 34 or juncture 36 is used to again divert or combine the flow of hot flow $H_F$ to prevent the complete formation of a thermal boundary layer thereby increasing the transfer of thermal energy across branched channels 30 from hot flow $H_F$ to cold flow $C_F$.

As compared to existing heat exchangers where air flow enters from one side of the heat exchanger and exits the other side in the same channel and layer as it entered, core 22 incorporates inter-layer mixing with branched channels 30 connecting across (to and from) other branched channels 30. This inter-connecting between branched channels 30 creates splits 34 and junctures 36 between multiple branched channels 30 in core 22. Splits 34 and junctures 36 route fluid through interconnections between fluidly parallel branched channels 30.

During the design process of core 22, boundary conditions and constraints are entered into the topological optimization tool to determine allowable pressure drops for each of hot flow $H_F$ and cold flow $C_F$ through heat exchanger 10. An objective of the topological optimization tool process is to maximize thermal energy transfer between hot flow $H_F$ and cold flow $C_F$ which includes the local temperature difference between hot flow $H_F$ and cold flow $C_F$, local thermal energy transfer coefficient(s), and local material distribution and density data. The topological optimization tool begins with an initial design state of core 22. In order to maximize thermal energy transfer, the topological optimization tool introduces branched channels 30 (along with splits 34 and junctures 36) and regions where cold flow $C_F$ comes into near contact with hot flow $H_F$ through a sidewall of one of branched channels 30, without mixing hot flow $H_F$ and cold flow $C_F$.

Generally in heat exchangers, one way to maximize transfer of thermal energy is to create a large amount of surface area of the objects within the heat exchanger. However, this concept traditionally presents pressure drop penalties for both hot and cold fluids. Hence, pressure drop constraints are used by the topological optimization tool to maximize the surface area between the two fluids. A conjoining sensitivity analysis throughout the design process drives the topological optimization tool to change material distribution in the design space and to determine branched channels 30 for hot flow $H_F$ and cold flow $C_F$ as well as the sidewalls between them. The design process with the topological optimization tool leads to a design of core 22 that maximizes transfer of thermal energy by optimally diffusing (e.g., without separating) hot flow $H_F$ into numerous branched channels 30 with low pressure loss, enhancing three-dimensional mixing of hot flow $H_F$ to increase transfer of thermal energy, and intermittently splitting and merging branched channels 30 throughout heat exchanger 10 via splits 34 and junctures 36 so as to increase surface area of core 22.

In addition to enabling construction of the three-dimensional design of core 22 created by the topological optimization tool, layer-by-layer additive manufacturing is also useful in reducing mass and/or weight of different components of heat exchanger 10, as well as reducing the number of details and associated assembly time. The single piece construction of inlet header 24, outlet header 26, and array 28 improves reliability by eliminating joints and related stress concentrations. For instance, in existing heat exchangers there is typically lot of mass in certain areas and not a lot of mass in another area. For example, there is often a lot of mass in the heat exchanger core but not a lot of mass in the headers, which causes large transient ramp ups and ramp downs because one portion heats up very quickly and the other very slowly due to the uneven mass distribution. In core 22, there is a more optimal distribution of material due to the design optimization provided by the topological optimization tool and layer-by-layer additive manufacturing process. Hot flow $H_F$ becomes diffused as soon as hot flow $H_F$ enters into array 28, due to branched channels 30 splitting right away, as well as due to the more uniform gradation of mass and material that provides a reduction in transient thermal stresses on core 22.

Further, layer-by-layer additive manufacturing allows core 22 to be optimized with less constraint on how to connect core 22 to external casing 12. The connections between core 22 and external casing 12 (e.g., inlet header 24 and outlet header 26 with hot inlet 14 and hot outlet 16, respectively) are made by metallurgical bond instead of just welded edges as in the conventional approaches. With layer-by-layer additive manufacturing, a material strength of heat exchanger 10 is not degraded as a result of welding and brazing, and the result is well-controlled joint topology.

Another advantage of core 22 utilizing topological optimization and layer-by-layer additive manufacturing, is that core 22 can include a non-cuboid shape allowing heat exchanger 10 to be formed in any shape in order to fit into a design space. As splits 34 and junctures 36 act to split and merge multiple flows of hot flow $H_F$ throughout array 28, thermal boundary layers within array 28 are reduced in length which provides a reduction in pressure drop as compared to existing used of physical structures such as pin fins.

The inter-layer mixing of individual fluid flows within core 22 improves thermal energy transfer coefficients of heat exchanger 10 as compared to conventional layer-based heat exchanger designs where no inter-mixing of fluid flows occurs. Core 22 also allows for a more uniform flow diffusion in branched channels 30 while also maximizing thermal energy transfer rates by mixing and varying shorter thermal boundary layer developing lengths throughout array 28.

Figure 3:
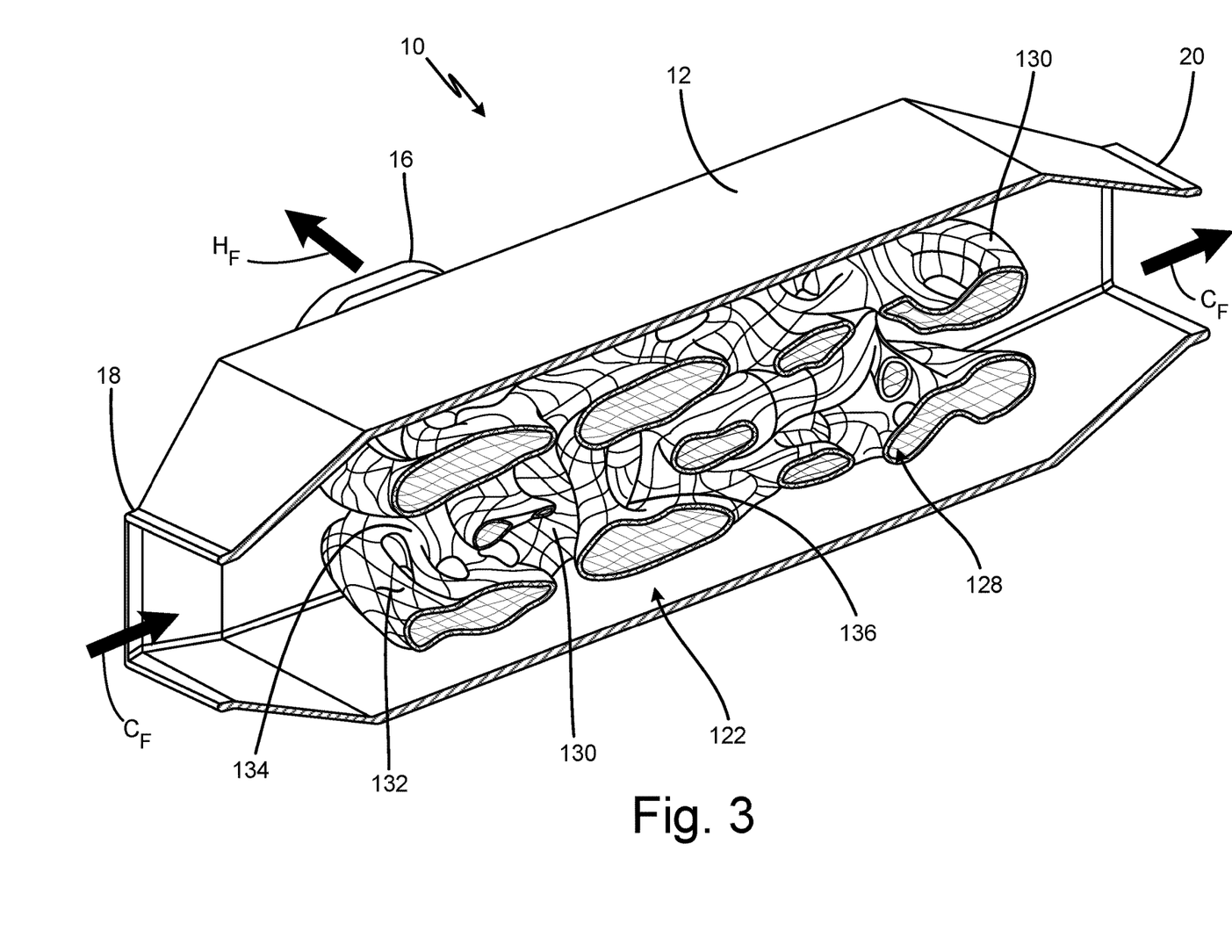
FIG. 3 is a cross-section view of the heat exchanger from FIG. 1 taken along 3-3 shown in FIG. 1.

FIG. 3 is a cross-section view of heat exchanger 10 from FIG. 1 taken along 3-3 and shows external casing 12 (with hot outlet 16, cold inlet 18, and cold outlet 20), core 122 (with array 128 of branched channels 130, exterior surface 132, splits 134, and junctures 136), hot flow $H_F$, and cold flow $C_F$. In FIG. 3, core 122 and its components include similar components as core 22 shown in FIG. 2 and are designated with character reference numerals that are 100 greater than the corresponding character reference numerals referenced in FIG. 2.

In FIG. 3, core 122 is shown as being disposed within exterior casing 12. Similar to array 22 of FIG. 2, array 122 includes branched channels 130 with exterior surface 132, splits 134, and junctures 136. In this embodiment, array 122 of branched channels 130 is shown as including a more organic, curvier shape than that of array 22. Put another way, the shape of array 122 includes branched channels 130 with many more shape variations than shown in FIG. 2. Here, array 122 is an irregularly shaped three dimensional manifold with inter-connecting branched channels 130 including shape profiles that are globular, bulbous, wavy, serpentine, erratic, unpredictable, and irregular as compared to existing heat exchanger core configurations with straight and planar channels separating the air flows. As can be seen in FIG. 3, the openings in array 122 created from the cross-section cut include wavy, curvy, non-linear shapes.

In the illustrated embodiment, core 122 is enclosed in external casing 12 such that an interior surface of external casing 12 and exterior surface 132 of the heat exchanger core together form a secondary flow path past and around core 122. Additionally, enclosing core 122 in external casing 12 includes forming, with the layer-by-layer additive manufacturing device, external casing 12 to encapsulate core 122 within external casing 12.

Figure 4:
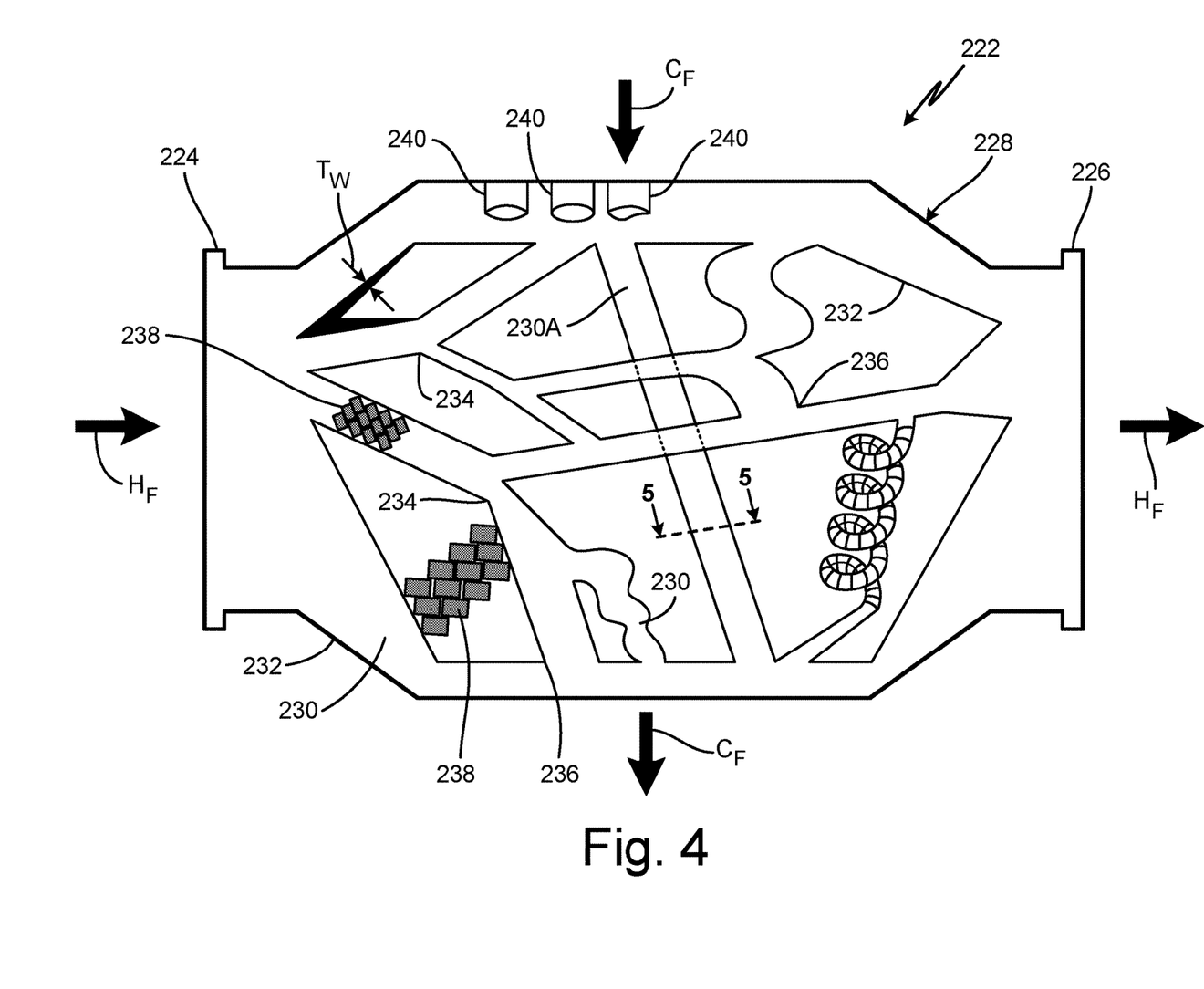
FIG. 4 is a partially-simplified schematic view of a third heat exchanger core showing headers, branched channels, splits, junctures, support features, and a thermodynamic feature.

FIG. 4 is a partially-simplified schematic view of core 222 and shows branched channels 230 (with interconnecting channel 230A, exterior surface 232, and wall thickness $T_W$), splits 234 (with primary split 234A), junctures 236 (with final juncture 236A), support features 238, thermodynamic features 240, hot flow $H_F$, and cold flow $C_F$. As with array 122 in FIG. 3, array 220 shown in FIG. 4 and its components are similar to the components shown in FIG. 3 and are indicated by character reference numerals with 100 added to the respective character reference numeral (e.g., array 222 correlates to arrays 122 and 22, branched channels 230 correlate to branched channels 130 and 30, etc.).

In addition to the elements shown in arrays 22 and 122, array 222 additionally includes interconnecting channel 230A, support features 238, and thermodynamic features 240. Wall thickness $T_W$ of is a thickness of a sidewall of branched channels 230. In this example, wall thickness $T_W$ of branched channels 230 can be 0.004 inches to 0.1 inches (0.102 millimeters to 2.54 millimeters). Interconnecting channel 230A is one of branched channels 230 that extends between and connects to two other branched channels 230 of array 228.

In this example, wall thickness $T_W$ of branched channels 230 varies throughout portions of array 228 of branched channels 230 to incorporate support for the layer-by-layer additive manufacturing build process, post-build structural support, and for thermal energy transfer control. For example, wall thickness $T_W$ of branched channels 230 can be tailored to provide necessary support during the construction of core 222. In another example, wall thickness $T_W$ of branched channels 230 varies throughout array 228 of branched channels 230 by varying at least one of between different branched channels 230, lengthwise along one of branched channels 230, and as a function of position along a flow path of branched channel 230.

Support features 238 are physical structures. In this example, support structures include a lattice structure including a regular, repeated three-dimensional arrangement of struts. Powder based or wire based layer-by-layer additive manufacturing processes or investment casting can be used to fabricate support features 238 and the selection of fabrication process parameters will be dependent on the materials and lattice geometry. Thermodynamic features 240 are physical heat sink structures. In this example, thermodynamic structures 240 can include a lenticular, an airfoil, or an elliptic shape.

In the illustrated embodiment, primary split 234A is at inlet header 224 and final juncture 236A is at outlet header 226, with both primary split 234A and final juncture 236A being common to (e.g., in fluid communication with) an entirety of array 228 of branched channels 230. A secondary branching structure includes one or more secondary splits 234 and one or more secondary junctures 236 that are situated between inlet header 224 and outlet header 226 such that a subset of the secondary splits 234 and secondary junctures 236 route fluid through interconnections (e.g., one or more interconnecting channels 230A) between fluidly parallel branched channels 230 from inlet header 224 to outlet header 226. In this non-limiting embodiment, the term fluidly parallel refers to multiple branched channels 230 being fluidly connected to both of inlet header 224 and outlet header 226 and such that branched channels 230 communicate multiple streams of fluid simultaneously from inlet header 224 to outlet header 226.

Support features 238 are connected to branched channels 230 at locations that are both inside of and outside of branched channels 230. For example, one of support features 238 as shown in FIG. 4 are mounted inside of one of branched channels 230 and in a portion of hot flow $H_F$. FIG. 4 also shows another one of support features 238 as being mounted to exterior surface 232 of one of branched channels 230 and extends between a second of branched channels 230. In another example, support features can connect to and extend between exterior surface 232 of array 228 and external casing 12

As shown in FIG. 4, thermodynamic features 240 are mounted onto an interior surface of one of branched channels 230 and extend into hot flow $H_F$. In other examples, thermodynamic features can be mounted on exterior surface 232 and extend into portions of cold flow $C_F$. Interconnecting channel 230A provides a fluid communication pathway between different channels to inter-mix flows between separate branched channels 230. Additionally, creating (one or more) interconnecting channel 230A forms fluid paths between parallel branched channels 230 to promote inter-layer mixing within hot flow $H_F$ through array 228 of branched channels 230.

Support features 238 improve the structural integrity of branched channels 230 as well as are able to sustain high internal pressure levels. Support features 238 structurally support branched channels 230, splits 343, and junctures 236 thereby replacing the functionality of traditionally thick channel walls of existing heat exchanger cores. Additionally, support features 238 provide for thermal energy transfer to cold flow $C_F$ and from hot flow $H_F$.

An interior and exterior topology and/or geometry of support features 238 can be varied and reinforced to withstand the expected construction and operational forces, to minimize weight, to tailor natural frequency, to transfer thermal energy, and/or to meet some other required function. Support features 238 provide both structural support and a secondary surface area for thermal energy transfer while also having a minimal effect on pressure drop across support features 238. Thermodynamic features 240 provide additional surface area through which thermal energy is transferred. The shapes (e.g., lenticular, elliptical, airfoil) of thermodynamic features 240 provide for a minimal pressure drop across thermodynamic features 240.

In contrast to existing heat exchanger core designs, interconnecting channel 230A provides a pathway that enables inter-layer mixing of hot flow $H_F$ across different channels of branched channels 230. Additionally, the combination of topological optimization and layer-by-layer additive manufacturing enables positioning and constructing of support structures 230 and thermodynamic features 240 such that pressure drop is minimized and thermal energy transfer is maximized.

Figure 5A:
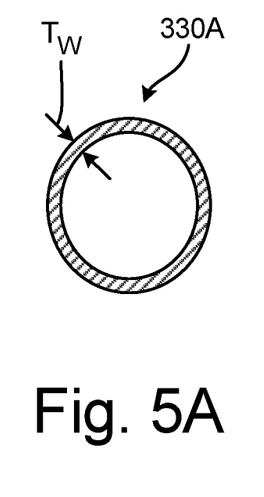
FIG. 5A is a cross-section view of a branched channel with a circular cross-section shape.
Figure 5B:
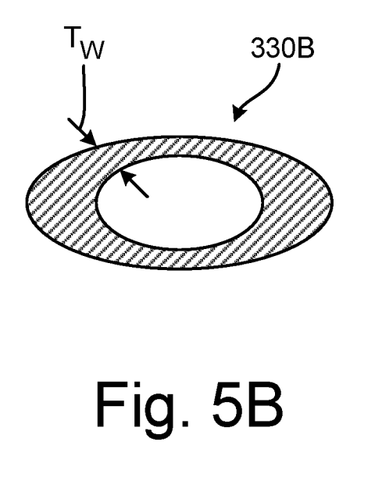
FIG. 5B is a cross-section view of a branched channel with an elliptical cross-section shape.
Figure 5C:
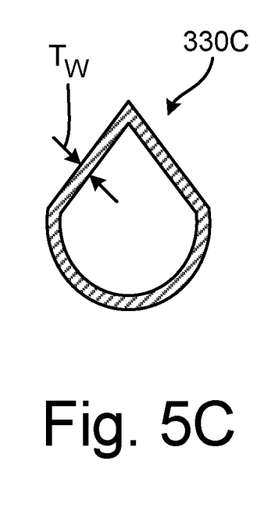
FIG. 5C is a cross-section view of a branched channel with a partially circular and partially tent shaped cross-section shape.

FIG. 5A is a cross-section view taken along 5-5 in FIG. 4 of branched channel 330A with a circular cross-section shape. FIG. 5B is a cross-section view taken along 5-5 in FIG. 4 of branched channel 330B with an elliptical cross-section shape. FIG. 5C is a cross-section view taken along 5-5 in FIG. 4 of branched channel 330C with a partially circular and partially tent shaped cross-section shape. In FIGS. 5A-5C, character reference numerals 330 are used in conjunction with the letters "A," "B," and "C" respectively to differentiate between the three different examples of branched channels. In FIGS. 5A-5C, branched channels 330A-330C correlate to one of branched channels 230 shown in FIG. 4.

Branched channel 330A includes a circular cross-section shape with a uniform wall thickness $T_W$ throughout the entire circumference of branched channel 330A. Branched channel 330B includes an elliptical cross-section shape with a non-uniform, non-variable wall thickness $T_W$ throughout the entire circumference of branched channel 330B. Branched channel 330C includes a partially circular and partially tent shaped cross-section shape with a uniform wall thickness $T_W$ throughout an outer boundary length of branched channel 330C.

Each of branched channel 330A, 330B and 330C include an outer boundary length as measured around the external surface of each. In this example, the outer boundary lengths of the branched channels (e.g., 30, 130, 230, 330A, 330B and 330C) can vary throughout the arrays (e.g., 28, 128, 228) of branched channels by varying at least one of between different branched channels, along one of the branched channels, and as a function of position along a flow path of the branched channels.

In another example, each of the cross-section shapes of branched channels 330A, 330B, and 330C (as well as branched channels 30, 130, and 230) vary throughout the array (e.g., any of arrays 28, 128, and 228) of branched channels based on a local pressure differential at specific portions along the branched channels, along the arrays, and/or along externals casing 12.

Here, branched channel 330C is an example of how layer-by-layer additive manufacturing can be used to create a structural shape of a branched channel so that internal (or external) support structures are not needed to support and maintain the structure of the branched channel, which helps to reduce the overall pressure drop of hot flow $H_F$ across the array (e.g., array 28, 128, or 228). For example, using a topological optimization tool in combination with a layer-by-layer additive manufacturing process to create the heat exchanger core (e.g., cores 20, 120, 220) enables rules associated with the layer-by-layer additive manufacturing process, such as overhang constraints to minimize support structure requirements.

In general, existing additively manufactured heat exchanger designs do not address manufacturing constraints imposed by layer-by-layer additive manufacturing, such as with laser powder bed fusion processes. As a result, existing additively manufactured heat exchanger designs incur support structures in the channels that introduce large pressure drops as the fluid flow passes across the support structures. In contrast, the design and construction of cores 20, 120, and 220 account for the layer-by-layer additive manufacturing constraints, such as overhanging wall requirements, during the topological optimization design process. Structures requiring overhang support structures are minimized or modified by the topological optimization tool, for example, by making partially circular channels pointed in the top flat region (e.g., the cross-section shape of branched channel 330C). Additionally, support features 238 (shown in FIG. 4), if required, are deigned simultaneously with the heat exchanger core (e.g., core 22, 122, 220) so that their impact on performance of heat exchanger 10 is minimized and/or leveraged to enhance performance.

Figure 6:
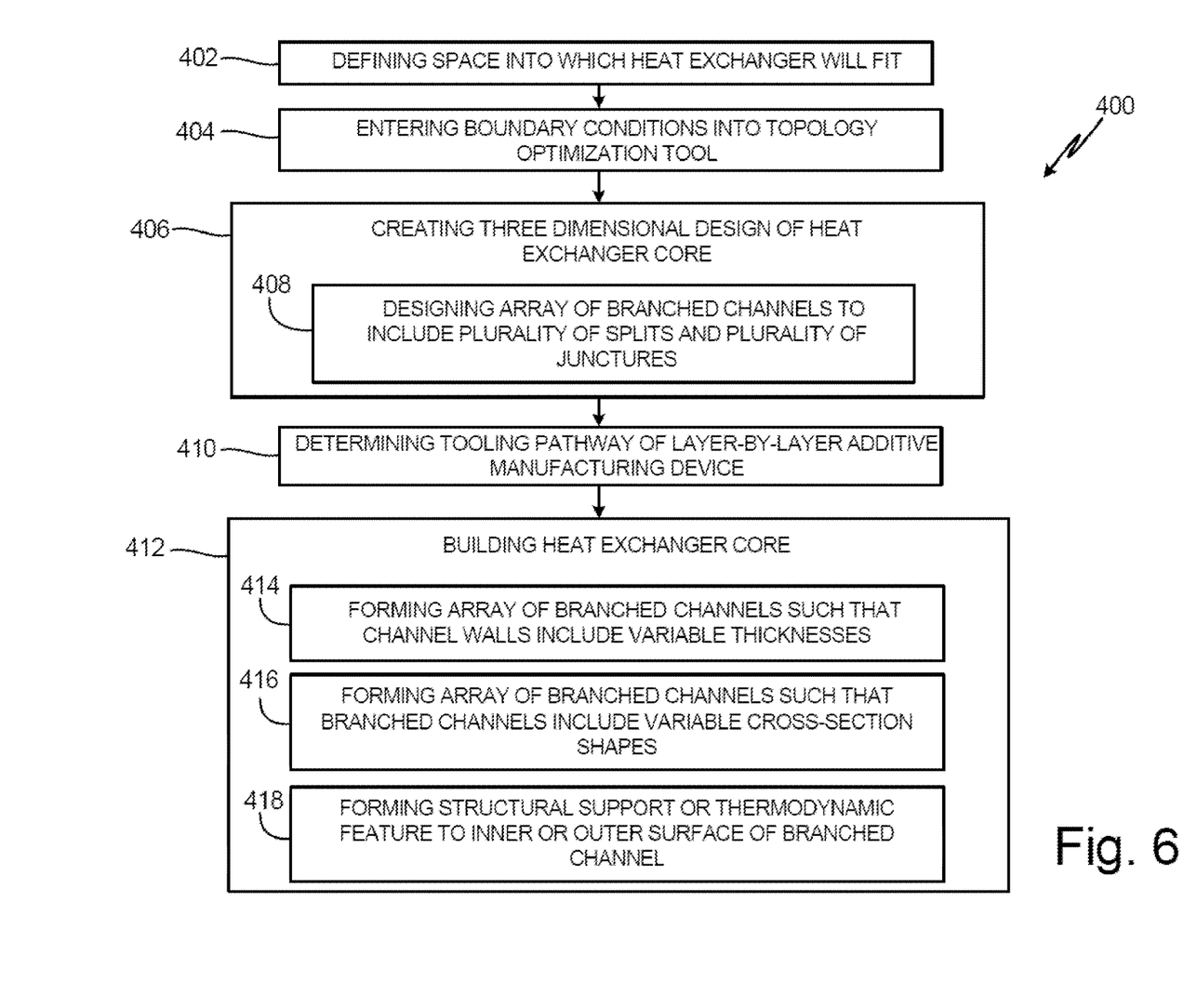
FIG. 6 is a flowchart of a method of making a heat exchanger core.

FIG. 6 is a flowchart of method 400 of making core 22 for heat exchanger 10 that includes steps 402-418.

Step 402 includes defining a space into which heat exchanger 10 will fit. Step 404 includes providing boundary conditions to a topology optimization tool. For example, the boundary conditions can include at least one of a pressure drop condition, a mass condition, and a thermal energy transfer condition. Step 406 includes creating, with the topology optimization tool, a three dimensional design of core 22 based on the boundary conditions. Step 406 also includes step 408 of designing array 28 of branched channels 30 to include a plurality of splits 34 and a plurality of junctures 36. Step 410 includes determining a tooling pathway of a layer-by-layer additive manufacturing device based on the three dimensional design of core 22 of heat exchanger 10. Step 412 includes building, with the layer-by-layer additive manufacturing device, core 22 of heat exchanger 10 based on the determined tooling pathway. Step 412 also includes steps 414, 416, and 418. Step 414 includes forming array 28 of branched channels 30 such that a channel wall of one of branched channels 30 includes a variable thickness. Step 416 includes forming array 28 of branched channels 30 such that one of branched channels 30 includes a variable cross-section shape. Step 418 includes forming at least one structural support feature 238 and/or thermodynamic feature 240 that is integrally formed with at least one of an inner or an outer surface of branched channel 230.

Discussion of Possible Embodiments

The following are non-exclusive descriptions of possible embodiments of the present invention.

A heat exchanger includes an external casing and a core. The external casing includes a first inlet, a first outlet, a second inlet, and a second outlet. The core includes an array of branched channels connecting the first inlet and first outlet, an inlet header, and an outlet header. The inlet header is integrally formed with and fluidly connected to the first inlet. The outlet header is integrally formed with and fluidly connected to the first outlet. The branched channels and the external casing define a fluidic passage. The array of branched channels includes a first split, a first juncture, a secondary split, a secondary juncture, and a subset of splits and junctures. The first split and first juncture are common to an entirety of the array of branched channels. The subset of splits and junctures route fluid through interconnections between fluidly parallel branched channels.

The heat exchanger of the preceding paragraph can optionally include, additionally and/or alternatively, any one or more of the following features, configurations and/or additional components.

Each of branched channels can include a channel wall with a thickness, wherein the thicknesses of the channel walls can vary throughout the array of branched channels by varying at least one of between different branched channels, along one of the branched channels, and/or as a function of position along a flow path of the branched channel.

The thicknesses of the channel walls can be 0.004 inch to 0.1 inch.

Each of branched channels can include an outer boundary length, wherein the outer boundary lengths of the branched channels can vary throughout the array of branched channels by varying at least one of between different branched channels, along one of the branched channels, and/or as a function of position along a flow path of the branched channel.

Each of branched channels can include a cross-section shape, wherein the cross-section shapes of the branched channels can vary throughout the array of branched channels, wherein the cross-section shapes of the branched channels can vary based on a local pressure differential at specific portions along the branched channels.

An interconnecting channel can extend between and/or connect to two branched channels of the array of branched channels.

A plurality of splits, wherein a split can be a point at which a single branched channel diverges into at least two branched channels; and a plurality of junctures, wherein a juncture can be a connection point where at least two branched channels converge into a single branched channel.

The array of branched channels can be built with a layer-by-layer additive manufacturing process.

A structural support feature can be integrally formed with at least one of an inner or an outer surface of a branched channel.

A thermodynamic feature can be integrally formed with at least one of an inner or an outer surface of a branched channel, wherein a shape of the thermodynamic feature can comprise a lenticular, an airfoil, and/or an elliptic shape.

A method of making a heat exchanger with a heat exchanger core includes defining a space into which the heat exchanger will fit. Boundary conditions, design objectives, and constraints are entered into a topology optimization tool. The design objectives include at least one of minimizing pressure drop, minimizing mass, and maximizing thermal energy transfer. The topology optimization tool creates a three dimensional design of a heat exchanger core based on the entered objectives, constrains, and boundary conditions. The core includes an array of branched channels connecting the first inlet and first outlet, an inlet header, and an outlet header. The array of branched channels includes a first split at the inlet header, a first juncture at the outlet header, a plurality of secondary splits, and a plurality of secondary junctures. The first split and first juncture are common to an entirety of the array of branched channels. The secondary splits and junctures are situated between the inlet header and the outlet header. A subset of the secondary splits and junctures route fluid through interconnections between fluidly parallel branched channels. A tooling pathway of a layer-by-layer additive manufacturing device is determined based on the three dimensional design of the heat exchanger core. The heat exchanger core is built with the layer-by-layer additive manufacturing device based on the determined tooling pathway.

The method of the preceding paragraph can optionally include, additionally and/or alternatively, any one or more of the following steps, features, configurations and/or additional components.

Fluid paths can be formed between parallel branched channels to promote inter-layer mixing within a flow through the array of branched channels.

The array of branched channels can be formed such that a channel wall of one of the branched channels can include a variable thickness.

The array of branched channels can be formed such that a branched channel can include a variable cross-section shape.

The array of branched channels can be designed to include a plurality of splits and a plurality of junctures, wherein a split can be a point at which a single branched channel diverges into at least two branched channels, and/or wherein a juncture can be a connection point where at least two branched channels converge into a single branched channel.

At least one of a structural support feature and a thermodynamic feature can be integrally formed with at least one of an inner or an outer surface of a branched channel, wherein a shape of the thermodynamic feature can comprise a lenticular, an airfoil, and/r an elliptic shape.

The heat exchanger core can be enclosed in an external casing having a casing inlet and a casing outlet, such that an interior surface of the external casing and an external surface of the heat exchanger core together can form a secondary flow path past and/or around the heat exchanger core.

The external casing can be formed with the layer-by-layer additive manufacturing device to encapsulate the heat exchanger core within the external casing.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A heat exchanger comprising:
an external casing comprising:
a first inlet;
a first outlet in fluid communication with the first inlet;
a second inlet; and
a second outlet in fluid communication with the second inlet; and
a core disposed within the external casing, the core comprising:
an inlet header integrally formed with and fluidly connected to the first inlet;
an outlet header integrally formed with and fluidly connected to the first outlet; and
a patternless array of jointless branched channels connecting the first inlet and to the first outlet, wherein the patternless array of jointless branched channels provides structural support to the heat exchanger core, wherein the external casing and an exterior surface of the patternless array of jointless branched channels define a fluidic passage between the second inlet and the second outlet, wherein the patternless array of jointless branched channels comprises:
a first split at the inlet header;
a first juncture at the outlet header, wherein the first split and first juncture are common to an entirety of the array of jointless branched channels; and
a secondary branching structure including one or more secondary splits and one or more secondary junctures, wherein the secondary split and secondary juncture are situated between the inlet header and the outlet header, and wherein a subset of the secondary splits and secondary junctures route fluid through interconnections between fluidly parallel jointless branched channels;
wherein the patternless array of jointless branched channels is configured such that there are no repeating patterns of branched channels, splits, and/or junctures within the core and the secondary branching structure is configured to prevent complete formation of a thermal boundary layer within the patternless array of jointless branched channels.

2. The heat exchanger of claim 1, wherein each of the jointless branched channels includes a channel wall with a thickness, wherein the thicknesses of the channel walls vary throughout the patternless array of jointless branched channels by varying at least one of between different jointless branched channels, along one of the jointless branched channels, and as a function of position along a flow path of the jointless branched channel.

3. The heat exchanger of claim 2, wherein the thicknesses of the channel walls are 0.004 inch to 0.1 inch.

4. The heat exchanger of claim 1, wherein each of the jointless branched channels includes an outer boundary length, wherein the outer boundary lengths of the jointless branched channels vary throughout the patternless array of jointless branched channels by varying at least one of between different jointless branched channels, along one of the jointless branched channels, and as a function of position along a flow path of the jointless branched channel.

5. The heat exchanger of claim 1, wherein each of the jointless branched channels includes a cross-section shape, wherein the cross-section shapes of the jointless branched channels vary throughout the patternless array of jointless branched channels, wherein the cross-section shapes of the jointless branched channels vary based on a local pressure differential at specific portions along the jointless branched channels.

6. The heat exchanger of claim 1, wherein the patternless array of jointless branched channels comprises an interconnecting channel extending between and connecting to two jointless branched channels of the patternless array of jointless branched channels.

7. The heat exchanger of claim 1, wherein the patternless array of jointless branched channels comprises:
   a plurality of splits, wherein a split is a point at which a single jointless branched channel diverges into at least two jointless branched channels; and
   a plurality of junctures, wherein a juncture is a connection point where at least two jointless branched channels converge into a single jointless branched channel.

8. The heat exchanger of claim 1, wherein the patternless array of jointless branched channels is built with a layer-by-layer additive manufacturing process.

9. The heat exchanger of claim 1, further comprising a structural support feature integrally formed with at least one of an inner or an outer surface of a jointless branched channel.

10. The heat exchanger of claim 1, further comprising a thermodynamic feature integrally formed with at least one of an inner or an outer surface of a jointless branched channel, wherein a shape of the thermodynamic feature comprises a lenticular, an airfoil, or an elliptic shape.

11. The heat exchanger of claim 1, wherein the patternless array of jointless branched channels routes fluid in a hybrid cross-counter flow through the heat exchanger core.

12. A method of making a heat exchanger with a heat exchanger core, the method comprising:
   defining a space into which the heat exchanger will fit;
   providing boundary conditions to a topology optimization tool, wherein the boundary conditions comprise a structural support condition and at least one of a pressure drop condition, a mass condition, and a thermal energy transfer condition;
   creating, with the topology optimization tool, a three dimensional design of a heat exchanger core of the heat exchanger based on the boundary conditions, wherein the heat exchanger core comprises:
      an inlet header;
      an outlet header;
      a patternless array of jointless branched channels comprising:
         a first split at the inlet header;
         a first juncture at the outlet header, wherein the first split and first juncture are common to an entirety of the patternless array of jointless branched channels; and
         a secondary branching structure comprising a plurality of secondary splits and secondary junctures, wherein each secondary split and secondary juncture is situated between the inlet header and the outlet header,
         wherein a subset of the secondary splits and junctures route fluid through interconnections between fluidly parallel jointless branched channels,
         wherein the patternless array of jointless branched channels provides structural support to the heat exchanger core;
         wherein the patternless array of jointless branched channels is configured such that there are no repeating patterns of branched channels, splits, and/or junctures within the core and the secondary branching structure is configured to prevent complete formation of a thermal boundary layer within the patternless array of jointless branched channels;
   determining a tooling pathway of a layer-by-layer additive manufacturing device based on the three dimensional design of the heat exchanger core; and
   building, with the layer-by-layer additive manufacturing device, the heat exchanger core based on the determined tooling pathway.

13. The method of claim 12, wherein creating the interconnections comprises forming fluid paths between parallel jointless branched channels to promote inter-layer mixing within a flow through the patternless array of jointless branched channels.

14. The method of claim 12, further comprising forming the patternless array of jointless branched channels such that a channel wall of one of the jointless branched channels includes a variable thickness.

15. The method of claim 12, further comprising forming the patternless array of jointless branched channels such that a jointless branched channel includes a variable cross-section shape.

16. The method of claim 12, wherein creating the three dimensional design of the heat exchanger core comprises designing the patternless array of jointless branched channels to include a plurality of splits and a plurality of junctures, wherein a split is a point at which a single branched channel diverges into at least two branched channels, and wherein a juncture is a connection point where at least two jointless branched channels converge into a single jointless branched channel.

17. The method of claim 12, further comprising forming at least one of a structural support feature and a thermodynamic feature that is integrally formed with at least one of an inner or an outer surface of a jointless branched channel, wherein a shape of the thermodynamic feature comprises a lenticular, an airfoil, or an elliptic shape.

18. The method of claim 12, further comprising enclosing the heat exchanger core in an external casing having a casing inlet and a casing outlet, such that an interior surface of the external casing and an external surface of the heat exchanger core together form a secondary flow path past and around the heat exchanger core.

19. The method of claim 18, wherein the enclosing the heat exchanger core in the external casing comprises forming, with the layer-by-layer additive manufacturing device, the external casing to encapsulate the heat exchanger core within the external casing.

20. The method of claim 12, wherein the patternless array of jointless branched channels routes fluid in a hybrid cross-counter flow through the heat exchanger core.

* * * * *